(12) United States Patent
Meyer et al.

(10) Patent No.: US 8,507,635 B2
(45) Date of Patent: Aug. 13, 2013

(54) MODIFIED POLYCARBONATES HAVING IMPROVED SURFACE PROPERTIES

(75) Inventors: Alexander Meyer, Düsseldorf (DE); Helmut-Werner Heuer, Krefeld (DE); Rafael Oser, Krefeld (DE); Rolf Wehrmann, Krefeld (DE)

(73) Assignee: Bayer Intellectual Property GmbH (DE)

( * ) Notice: Subject to any disclaimer, the term of this patent is extended or adjusted under 35 U.S.C. 154(b) by 0 days.

(21) Appl. No.: 13/057,648

(22) PCT Filed: Jul. 30, 2009

(86) PCT No.: PCT/EP2009/005505
§ 371 (c)(1),
(2), (4) Date: Feb. 4, 2011

(87) PCT Pub. No.: WO2010/015354
PCT Pub. Date: Feb. 11, 2010

(65) Prior Publication Data
US 2011/0152470 A1 Jun. 23, 2011

(30) Foreign Application Priority Data
Aug. 5, 2008 (DE) .................. 10 2008 036 406

(51) Int. Cl.
C08G 73/00 (2006.01)
(52) U.S. Cl.
USPC ........... 528/170; 528/172; 528/173; 528/191; 528/194; 528/193; 528/196; 528/199; 528/204; 524/602; 524/611; 525/534; 428/412
(58) Field of Classification Search
USPC ................. 528/170, 172, 173, 191, 193, 194, 528/196, 199, 204; 524/602, 611; 525/534; 428/412
See application file for complete search history.

(56) References Cited

U.S. PATENT DOCUMENTS

| | | | |
|---|---|---|---|
| 2,964,794 A | 12/1960 | Peilstoecker et al. | |
| 2,991,273 A | 7/1961 | Hechelhammer et al. | |
| 2,999,835 A | 9/1961 | Goldberg | |
| 2,999,846 A | 9/1961 | Schnell et al. | |
| 3,148,172 A | 9/1964 | Fox | |
| 3,271,367 A | 9/1966 | Schnell et al. | |
| 3,494,885 A | 2/1970 | Thompson et al. | |
| 3,553,167 A | 1/1971 | Schnell et al. | |
| 3,752,048 A | 8/1973 | Tokutomi | |
| 4,386,186 A | 5/1983 | Maresca et al. | |
| 4,393,190 A | 7/1983 | Tyrell et al. | |
| 4,600,753 A | 7/1986 | Freitag et al. | |
| 4,661,580 A | 4/1987 | Ranade | |
| 4,680,372 A | 7/1987 | Rosenfeld | |
| 4,982,014 A | 1/1991 | Freitag et al. | |
| 4,994,579 A | 2/1991 | Reuter et al. | |
| 5,126,428 A | 6/1992 | Freitag et al. | |
| 5,227,458 A | 7/1993 | Freitag et al. | |
| 6,214,505 B1 | 4/2001 | Ong et al. | |
| 6,309,785 B1 | 10/2001 | Qi et al. | |
| 6,596,840 B1 | 7/2003 | Kratschmer et al. | |
| 6,740,730 B1 | 5/2004 | Kratschmer et al. | |
| 7,547,755 B2 | 6/2009 | Heuer | |
| 2002/0137873 A1 | 9/2002 | Bailly et al. | |
| 2006/0194070 A1* | 8/2006 | Croll et al. ................. | 428/473.5 |

FOREIGN PATENT DOCUMENTS

| | | |
|---|---|---|
| DE | 1031507 | 6/1958 |
| DE | 1137167 | 9/1962 |
| DE | 1570703 | 2/1970 |
| DE | 1495626 | 6/1971 |
| DE | 1785137 | 1/1972 |
| DE | 2036052 | 1/1972 |
| DE | 2063050 | 7/1972 |
| DE | 2119799 | 11/1972 |
| DE | 2232977 | 2/1973 |
| DE | 2211956 | 10/1973 |
| DE | 2701173 | 7/1978 |
| DE | 3832396 | 2/1990 |
| DE | 3834660 | 4/1990 |
| DE | 102006046330 A1 | 4/2008 |
| EP | 26030 | 4/1981 |
| EP | 0026120 | 4/1981 |
| EP | 0026121 | 4/1981 |
| EP | 0026684 | 4/1981 |
| EP | 29845 | 6/1981 |
| EP | 0079075 | 5/1983 |
| EP | 0089801 | 9/1983 |
| EP | 0091602 | 10/1983 |
| EP | 0097970 | 1/1984 |
| EP | 132547 | 2/1985 |
| EP | 0146887 | 7/1985 |
| EP | 0156103 | 10/1985 |
| EP | 0234913 | 9/1987 |
| EP | 0240301 | 10/1987 |
| EP | 0269324 | 6/1988 |
| EP | 0353594 | 2/1990 |
| EP | 0634445 | 1/1995 |
| FR | 1561518 | 3/1969 |
| GB | 905072 | 9/1962 |
| GB | 1122003 | 7/1968 |
| GB | 1229482 | 4/1971 |
| GB | 1341318 | 12/1973 |
| GB | 1367790 | 9/1974 |
| GB | 1592724 | 7/1981 |
| JP | 07179594 | 7/1995 |
| WO | WO-80/02723 | 12/1980 |
| WO | WO-99/55772 | 11/1999 |
| WO | WO-00/37442 | 6/2000 |
| WO | WO-01/05866 | 1/2001 |
| WO | WO-01/05867 | 1/2001 |

* cited by examiner

Primary Examiner — Shane Fang
(74) Attorney, Agent, or Firm — Novak Druce Connolly Bove + Quigg LLP

(57) ABSTRACT

The present invention relates to polycarbonates comprising imide-containing aryl mono- or dihydroxy compounds as chain terminators and, respectively, monomer units, and also to compositions comprising the said polycarbonates, to their use for the production of mouldings, and to mouldings obtainable therefrom.

12 Claims, No Drawings

MODIFIED POLYCARBONATES HAVING IMPROVED SURFACE PROPERTIES

CROSS-REFERENCE TO RELATED APPLICATIONS

This application is a national stage application (under 35 U.S.C. §371) of PCT/EP2009/005505, filed Jul. 30, 2009, which claims benefit of German application 102008036406.1, filed Aug. 5, 2008.

BACKGROUND OF THE INVENTION

The present invention relates to the use of imide-containing aryl mono- and dihydroxy compounds as chain terminators and, respectively, monomer units for the production of polycarbonates, and also to polycarbonates comprising structures derived from imide-containing aryl hydroxy compounds, to processes for the production of the polycarbonates, to mouldings and extrudates obtainable from the said polycarbonates, and also to processes for the production of the mouldings and extrudates.

The high heat resistance of polycarbonates permits their use inter alia in sectors where they are likely to encounter high temperatures. Specific copolycarbonates (an example being a copolycarbonate based on bisphenol A and bisphenol TMC (1,1-bis(4-hydroxyphenyl)-3,3,5-trimethylcyclohexane)) can give a further increase in heat resistance. The said polycarbonates are therefore also suitable for the production of lenses, reflectors, lamp covers and lamp housings, etc.

These materials do not only have to have good processability and good mechanical properties; they also have to satisfy other requirements, such as good surface quality in the resultant injection moulding, and also good adhesion to metal.

Heat resistance and mechanical properties can be varied widely as a function of the bisphenols used and of appropriate adjustment of the molecular weight of the homo- and copolycarbonates. However, the adhesion of the said polycarbonates to metal is often not ideal. Specifically in the reflectors sector, good adhesion to metal is essential.

Compounds used as chain terminators for the production of conventional polycarbonates are often monofunctional compounds based on phenol, examples being phenol, and 4-alkylphenols, such as p-tert-butylphenol, and 4-cumylphenol (Kunststoff-Handbuch [Plastics Handbook] 3; L. Bottenbruch, Hanser, Munich 1992, p. 127; EP-A 0 353 594).

Polyetherimide-containing polycarbonates are described in U.S. Pat. No. 4,393,190. These modified polycarbonates have improved chemicals resistance, but no mention is made of properties relating to adhesion to metal. The constitution of the polycarbonates or copolycarbonates described in the said document is moreover different than that of the copolycarbonates of the invention.

WO 00/37442 A1 describes polycarbonates having imide units. Here again, no mention is made of improved adhesion to metal. The constitution of the polycarbonates or copolycarbonates described in the said document is moreover different.

According to JP-A 07179594, nitro-functionalized polycarbonates exhibit improved properties of adhesion to metal. The said polymers are not the subject matter of this application.

U.S. Pat. No. 6,214,505 describes polycarbonates having imide units. However, the polycarbonates of the invention differ from these in having a different structure. U.S. Pat. No. 6,214,505 gives no details of surface properties.

DE 3834660 A1 describes the synthesis of etherimides. Again, the structure of these differs from that of the polycarbonates of the invention described here. There is no description of surface properties.

Plasma pre-treatment can sometimes alter the surface properties of polymers. Methods of this type are described by way of example by Friedrich et al. in Metallized plastics 5&6: Fundamental and applied aspects and H. Grünwald et al. in Surface and Coatings Technology 111 (1999) 287-296. However, surface treatment of plastics implies additional technical cost and can sometimes lead to damage to the plastics surface.

Various methods can be used to apply metals to the polymer, examples being vapour deposition or sputtering. There is a more detailed description of the processes by way of example in "Vakuumbeschichtung [Vacuum coating] Volumes 1 to 5", H. Frey, VDI-Verlag Düsseldorf 1995 or "Oberflächen- and Dünnschicht-Technologie [Technology of surfaces and thin layers]" Part 1, R. A.

BRIEF SUMMARY OF THE INVENTION

Starting from the prior art, the object was therefore to modify polycarbonates in such a way that they have improved surface properties, particularly in relation to the adhesion of metals, without any essential need for corresponding pre-treatment of the surface.

It is also desirable that the modified polycarbonates are not attended by any significant degradation on heating, for example in the extrusion process or in injection moulding, or else in the production process, for example using the melt transesterification method, since the said polycarbonates or copolycarbonates are in particular used at high ambient temperatures—e.g. in reflectors.

It has now been found that homo- and copolycarbonates or homo- and cooligocarbonates (hereinafter subsumed under the term "polycarbonate or polycarbonates") modified with imide-containing groups have improved adhesion to metals.

Another object was to provide these imide-containing end groups or monomer units which can be incorporated into polycarbonates and give materials with improved surface properties, in particular with improved adhesion to metal. In order to incorporate the appropriate imide-containing end groups or monomers into polycarbonate, it is necessary that these bear phenolic OH groups.

This invention therefore provides polycarbonates modified with imide-containing groups, e.g. as end group or monomer unit.

The present invention therefore provides polycarbonates which comprise structures based on imide-containing phenols or bisphenols (also termed diphenols hereinafter), the use of these polycarbonates and copolycarbonates for the production of mouldings, and the use of imide-containing phenols as chain terminators or bisphenols during the production of polymers, in particular of polycarbonates and copolycarbonates.

The invention provides polycarbonates comprising, as diphenol unit, a compound of the structure: (I)

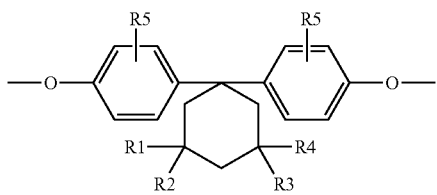

where
R1 to R5, independently of one another, are H or C1-C5-alkyl, preferably H or methyl,
and also comprising at least one of the following structures (II), (III), (IV) and (V)

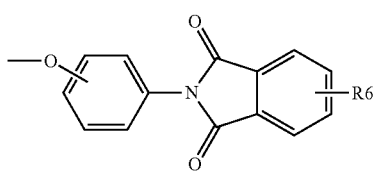

where R6 is H or C1-C12-alkyl, preferably H,
and

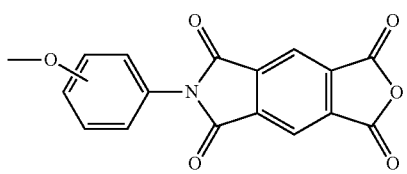

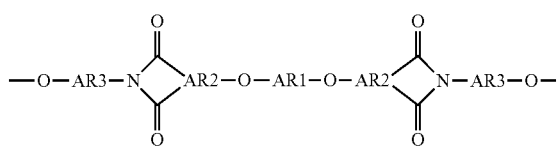

where
AR1 is an unsubstituted or substituted aryl moiety,
AR2 is an unsubstituted or substituted trivalent aryl moiety, preferably a trivalent phenyl or naphthyl moiety, which can have substitution by C1-C10-alkyl and/or by halogen, preferably by methyl, by ethyl and/or by halogen, and
AR3 is an unsubstituted or substituted divalent aryl moiety, preferably a divalent phenyl moiety, which can have substitution by C1-C10-alkyl, by C1-C10-alkyl having one or more hydroxy substituents, preferably C1-C10-alkyl having from 1 to 5 substituents, and/or by halogen, or AR3 is alkyl, preferably having from 1 to 8 carbon atoms, particularly preferably having from 1 to 4 carbon atoms, very particularly preferably being ethyl, and

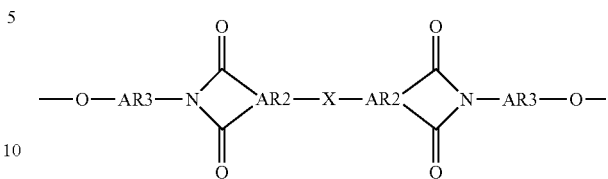

where AR2 and AR3 are defined as above and
X is O, S or a single bond, preferably being oxygen.

DETAILED DESCRIPTION OF THE INVENTION

The moiety AR1 preferably derives from diphenols, e.g. from hydroquinone, resorcinol, dihydroxybiphenyl, bis(hydroxyphenyl)alkanes, bis(hydroxyphenyl)cycloalkanes, bis(hydroxyphenyl) sulphides, bis(hydroxyphenyl)ethers, bis(hydroxyphenyl) ketones, bis(hydroxyphenyl) sulphones, bis(hydroxyphenyl) sulphoxides, α,α-bis(hydroxyphenyl)diisopropylbenzenes, and also their alkylated, ring-alkylated and ring-halogenated compounds. It is particularly preferable that the moiety AR1 derives from hydroquinone, 4,4'-dihydroxybiphenyl, 2,2-bis(4-hydroxyphenyl)-1-phenylpropane, 1,1-bis(4-hydroxyphenyl)phenylethane, 2,2-bis(4-hydroxyphenyl)propane (bisphenol A), 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulphone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC).

In particular, AR1 derives from hydroquinone, 4,4'-dihydroxybiphenyl, 1,1-bis(4-hydroxy-phenyl)phenylethane, 2,2-bis(4-hydroxyphenyl)propane, 2,2-bis(3,5-dimethyl-4-hydroxy-phenyl)propane, 1,1-bis(4-hydroxyphenyl)cyclohexane and 1,1-bis(4-hydroxyphenyl)-3,3,5-trimethylcyclohexane (bisphenol TMC); it particularly preferably derives from hydroquinone, bisphenol A and bisphenol TMC.

These, and other, suitable diphenols are described by way of example in U.S. Pat. Nos. 2,999,835, 3,148,172, 2,991,273, 3,271,367, 4,982,014 and 2,999,846, in the German Offenlegungsschriften 1 570 703, 2 063 050, 2 036 052, 2 211 956 and 3 832 396, in the French Patent 1 561 518, in the monograph "Chemistry and Physics of Polycarbonates, Interscience Publishers, New York 1964, pp. 28 ff; pp. 102 ff" by H. Schnell, and in "D. G. Legrand, J. T. Bendler, Handbook of Polycarbonate Science and Technology, Marcel Dekker New York 2000, pp. 72 ff".

Particularly preferred phenyl substituents of AR3 in formula IV and V are methyl, ethyl, propyl, butyl, and also hydroxymethyl, hydroxyethyl, hydroxypropyl or hydroxybutyl.

Other suitable diphenol units are diphenols of the formula (VIII). Alongside the above-mentioned diphenols of the formula (I) or structures derived therefrom, further diphenols of the formula (VIII) can be used for the production of polycarbonates of the invention:

HO—Z—OH (VIII)

in which
Z is an aromatic moiety having 6 to 30 carbon atoms which can comprise one or more aromatic rings, can have substitution and can comprise aliphatic or cycloaliphatic moieties or alkylaryl moieties or heteroatoms as bridging units.

Z in formula (VIII) is preferably a moiety of the formula (VIIIa)

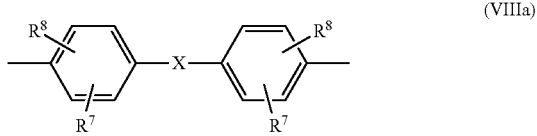

in which $R^7$ and $R^8$ independently of one another are H, $C_1$-$C_{18}$-alkyl, $C_1$-$C_{18}$-alkoxy, halogen, such as Cl or Br, or respectively unsubstituted or substituted aryl or aralkyl, preferably being H or $C_1$-$C_{12}$-alkyl, particularly preferably being H or $C_1$-$C_8$-alkyl and very particularly preferably being H or methyl, and X is a single bond, —$SO_2$—, —CO—, —O—, —S—, $C_1$-$C_6$-alkylene, $C_2$-$C_5$-alkylidene or $C_5$-$C_6$-cycloalkylidene which can have substitution by $C_1$-$C_6$-alkyl, preferably methyl or ethyl, or is $C_6$-$C_{12}$-arylene which can, if appropriate, have been condensed with further aromatic rings comprising heteroatoms.

It is preferable that X is a single bond, $C_1$-$C_5$-alkylene, $C_2$-$C_5$-alkylidene, $C_5$-$C_6$-cycloalkylidene, —O—, —SO—, —CO—, —S—, —$SO_2$—, or is a moiety of the formula (VIIIb) or (VIIIc)

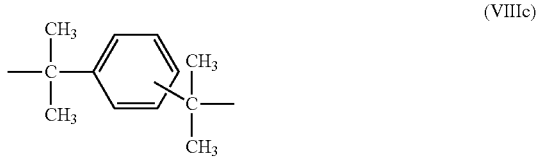

where $R^9$ and $R^{10}$ can be individually selected for each $X^1$ and, independently of one another, are hydrogen or $C_1$-$C_6$-alkyl, preferably hydrogen, methyl or ethyl.

Examples of diphenols of the formula (VIII) are: dihydroxybenzenes, dihydroxybiphenyls, bis(hydroxyphenyl)alkanes, bis(hydroxyphenyl)cycloalkanes, bis(hydroxyphenyl) aryl compounds, bis(hydroxyphenyl)ethers, bis(hydroxyphenyl) ketones, bis(hydroxyphenyl) sulphides, bis(hydroxy-phenyl) sulphones, bis(hydroxyphenyl) sulphoxides, 1,1'-bis(hydroxyphenyl)diisopropylbenzenes, and also ring-alkylated and ring-halogenated compounds related thereto.

Preferred diphenols of the formula (VIII) suitable for the production of the polycarbonates are hydroquinone, resorcinol, dihydroxybiphenyl, bis(hydroxyphenyl)alkanes, bis(hydroxy-phenyl)cycloalkanes, bis(hydroxyphenyl) sulphides, bis(hydroxyphenyl)ethers, bis(hydroxyphenyl) ketones, bis(hydroxyphenyl) sulphones, bis(hydroxyphenyl) sulphoxides, α,α-bis(hydroxy-phenyl)diisopropylbenzenes, and also their alkylated, ring-alkylated and ring-halogenated compounds.

Particularly preferred diphenols are 4,4'-dihydroxybiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulphone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC).

Very particularly preferred diphenols are 4,4'-dihydroxybiphenyl, 1,1-bis(4-hydroxy-phenyl)phenylethane, 2,2-bis(4-hydroxyphenyl)propane, 2,2-bis(3,5-dimethyl-4-hydroxy-phenyl)propane, 1,1-bis(4-hydroxyphenyl)cyclohexane and 1,1-bis(4-hydroxyphenyl)-3,3,5-trimethylcyclohexane (bisphenol TMC).

These, and other, suitable diphenols are described by way of example in U.S. Pat. Nos. 2,999,835, 3,148,172, 2,991,273, 3,271,367, 4,982,014 and 2,999,846, in the German Offenlegungsschriften 1 570 703, 2 063 050, 2 036 052, 2 211 956 and 3 832 396, in the French Patent 1 561 518, in the monograph "Chemistry and Physics of Polycarbonates, Interscience Publishers, New York 1964, pp. 28 ff; pp. 102 ff" by H. Schnell, and in "D. G. Legrand, J. T. Bendler, Handbook of Polycarbonate Science and Technology, Marcel Dekker New York 2000, pp. 72 ff".

The diphenols of the formula (VIII) can be used either alone or else in a mixture with one another.

In particular, the polycarbonates of the invention comprise, as further diphenol units according to formula (VIII), bisphenol A, alongside the compounds of the structure (I).

Particular preference is given to the following structure of the formula (IVa):

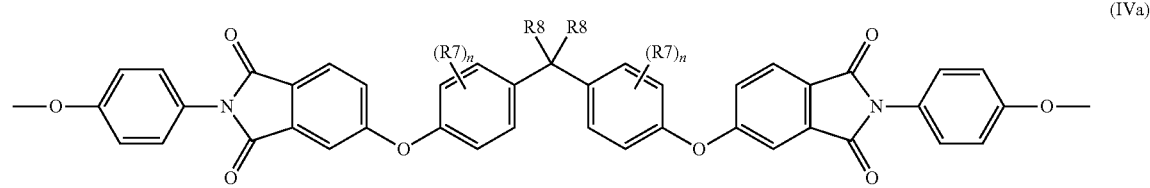

where each $R^7$ independently of the others is $C_1$-$C_6$-alkyl and/or halogen, preferably methyl, ethyl, n-propyl, isopropyl, chlorine and/or bromine, n is 0, 1, 2, 3 or 4, preferably 0, 1 or 2, and each R8 independently of the others is $C_1$-$C_{10}$-alkyl, preferably $C_1$-$C_6$-alkyl, in particular methyl or ethyl; it is also possible that the two R8 moieties together form an unsubstituted or substituted cyclic alkyl moiety, preferably forming a cyclohexyl or trimethylcyclohexyl moiety.

Particular preference is likewise given to the following structure of the formula (IVb):

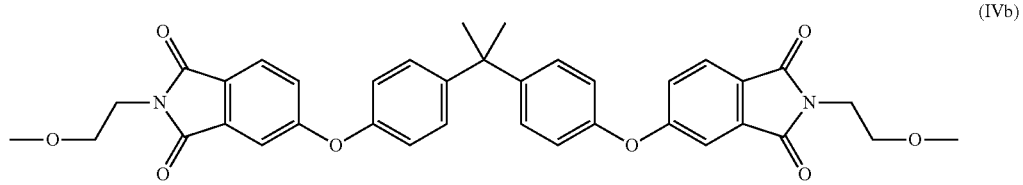

(IVb)

Carbonate units have been used to incorporate the above-mentioned structures into the polymer chain.

Particular preference is given to two groups of polycarbonates of the invention, the first being those which comprise, alongside the diphenol unit of the formula (I), structures of the formula (II) and/or (III), particularly preferably of the formula (II), and the second being those which also comprise, alongside diphenols of the formula (I), structures of the formula (IV) and/or (V).

However, the general or preferred-range definitions or explanations listed above for the moieties can also be combined as desired with one another, thus giving any desired combination between the respective ranges and preferred ranges. They apply to the final products and also apply correspondingly to the precursors and intermediates.

The amount of chain terminator to be used of the formulae (II) and/or (III) derived from corresponding phenols, or the amount of the structures of the formula (II) and/or (III) present in the polycarbonate, is from 0.5 to 8 mol %, preferably from 2 to 6 mol %, based on one mole of the particular diphenol(s) used. The production of the polycarbonate can use not only the phenolic compounds of the formulae (II) and/or (III) but also other phenols as chain terminators, in amounts up to 90 mol %, preferably up to 75 mol %, in particular up to 70 mol %, based on the respective total amount of chain terminator. Examples of these phenols are phenol, cumylphenol and tert-butylphenol.

If diphenols derived from the monomer units (IV) and (V) are used, the amounts of these used, or the amounts thereof present in the polycarbonate, based on the total number of moles of diphenol used, are from 5 to 50 mol %, preferably from 10 to 30 mol %.

The amount of diphenols of the formula (I) can generally be replaced by up to 95 mol %, preferably 90 mol %, of bisphenols of the formula (VIII).

The compounds of the invention can in principle be produced by known methods of organic chemistry. By way of example, the imide-functionalized monophenols can be produced from aminophenols and aromatic anhydrides. This is described by way of example in EP-A 132547.

According to DE-A 2 119 799, polycarbonates are produced with involvement of phenolic end groups by the interfacial process or else by the homogeneous-phase process.

For the production of polycarbonates by the interfacial process, reference may be made by way of example to H. Schnell, Chemistry and Physics of Polycarbonates, Polymer Reviews, Vol. 9, Inter-science Publishers, New York 1964 pp. 33 ff., and to Polymer Reviews, Vol. 10, "Condensation Polymers by Interfacial and Solution Methods", Paul W. Morgan, Interscience Publishers, New York 1965, Chapter VIII, pp. 325.

The polycarbonates of the invention can also be produced from diaryl carbonates and diphenols by the known polycarbonate process in the melt, known as the melt transesterification process, described by way of example in WO-A 01/05866 and WO-A 01/05867. Transeseterification processes (acetate process and phenyl ester process) are also described by way of example in U.S. Pat. Nos. 3,494,885, 4,386,186, 4,661,580, 4,680,371 and 4,680,372, in EP-A 26 120, 26 121, 26 684, 28 030, 39 845, 91 602, 97 970, 79 075, 14 68 87, 15 61 03, 23 49 13 and 24 03 01, and in DE-A 14 95 626 and 22 32 977.

Diaryl carbonates are carbonic diesters of the formula (VI)

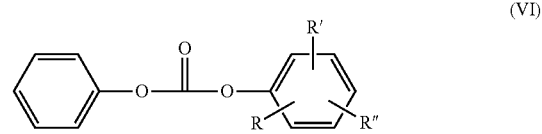

(VI)

and formula (VII)

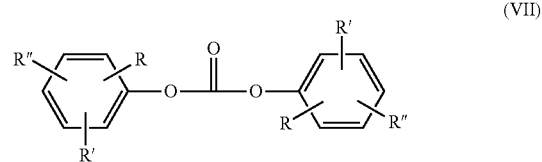

(VII)

where R, R' and R" independently of one another can be H, or unbranched or branched $C_1$-$C_{34}$-alkyl/cycloalkyl, $C_7$-$C_{34}$-alkaryl or $C_6$-$C_{34}$-aryl or $C_6$-$C_{34}$-aryloxy, examples being diphenyl carbonate, butylphenyl phenyl carbonate, dibutylphenyl carbonate, isobutylphenyl phenyl carbonate, diisobutylphenyl carbonate, tert-butylphenyl phenyl carbonate, di-tert-butylphenyl carbonate, n-pentylphenyl phenyl carbonate, di(n-pentylphenyl) carbonate, n-hexylphenyl phenyl carbonate, di(n-hexylphenyl) carbonate, cyclohexylphenyl phenyl carbonate, dicyclohexylphenyl carbonate, phenylphenol phenyl carbonate, diphenylphenol carbonate, isooctylphenyl phenyl carbonate, diisooctylphenyl carbonate, n-nonylphenyl phenyl carbonate, di(n-nonylphenyl) carbonate, cumylphenyl phenyl carbonate, dicumylphenyl carbonate, naphthylphenyl phenyl carbonate, dinaphthylphenyl carbonate, di-tert-butylphenyl phenyl carbonate, di(di-tert-butylphenyl) carbonate, dicumylphenyl phenyl carbonate, di(dicumylphenyl) carbonate, 4-phenoxyphenyl phenyl carbonate, di(4-phenoxyphenyl) carbonate, 3-pentadecylphenyl phenyl carbonate, di(3-pentadecylphenyl) carbonate, tritylphenyl phenyl carbonate, ditritylphenyl carbonate, preferably diphenyl carbonate, tert-butylphenyl phenyl carbonate, di-tert-butylphenyl carbonate, phenylphenol phenyl carbonate, diphenylphenol carbonate, cumylphenyl phenyl carbonate, dicumylphenyl carbonate, and particularly preferably diphenyl carbonate.

In addition to the abovementioned diphenols of the formula (VIII), it is also possible to use compounds having three or more phenolic hydroxy groups. This method gives branched polycarbonates.

Examples of some of the compounds that can be used having three or more than three phenolic hydroxy groups are phloroglucinol, 4,6-dimethyl-2,4,6-tri(4-hydroxyphenyl) hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol and tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The aromatic polycarbonates of the present invention have number-average molecular weights Mn (determined by gel permeation chromatography (GPC) and calibration with polycarbonate) of from 500 to 500 000, preferably from 500 to 100 000, particularly preferably from 1000 to 100 000, very particularly preferably from 5000 to 40 000 and most particularly preferably from 6000 to 20 000.

In the event that the polycarbonates of the invention have molecular weights in the oligomer region (the term used hereinafter being oligocarbonates), these oligocarbonates have average molecular weights ($M_n$, number average) of from 500 to 5000, preferably from 700 to 4000 (determined by gel permeation chromatography (GPC) and calibration with polycarbonate).

The invention further provides thermoplastic compositions comprising oligocarbonates of the invention, preferably in an amount of from >0 up to 20% by weight, preferably up to 10% by weight, in particular from 1 to 10% by weight, very particularly preferably from 2 to 10% by weight. It is preferable that the compositions comprise oligocarbonates of the invention and polycarbonates A composed of one or more diphenols composed of compounds of the formula (VIII), in particular bisphenol A, bisphenol TMC or a mixture thereof.

The polycarbonates (A) preferably have average molar masses $M_w$ (weight average) of from 15 000 to 80 000 g/mol, particularly preferably from 18 000 to 60 000 g/mol, in particular from 22 000 to 40 000 g/mol (determined by gel permeation chromatography (GPC) and calibration with polycarbonate).

In the case of the interfacial polycondensation process, the chain terminators of the formula (II) and/or (III) can be added as appropriate hydroxy compound prior to, during or after the phosgenation process, in solution. Examples of suitable solvents for dissolving the chain terminators of the formula II or III are methylene chloride, chlorobenzene, THF or acetonitrile, or else a mixture of the said solvents.

In the case of the melt transesterification process, there is the possibility, according to the process of the invention, of adding the chain terminators of the formula (II) and/or (III) (as appropriate hydroxy compound in each case) at any juncture of the reaction; this addition can be divided into a number of portions.

Diphenols for the production of the polycarbonates of the invention can also be polymers or condensates having phenolic end groups, and the invention therefore also includes polycarbonates and, respectively, copolycarbonates having block structures.

The polycarbonates of the invention can be worked up in a known manner and processed to give any desired mouldings, for example by extrusion or injection moulding.

The polycarbonates of the invention can also receive admixtures of other aromatic polycarbonates and/or other aromatic polyester carbonates and/or other aromatic polyesters, in a known manner.

The polycarbonates of the invention can also receive admixtures of the additives conventional for the said thermoplastics, examples being fillers, UV stabilizers, IR stabilizers, heat stabilizers, antistatic agents and pigments, in the usual amounts; if appropriate, it is also possible to add external mould-release agents, flow agents, and/or flame retardants, in order to improve mould-release behaviour, flow behaviour, and/or flame retardancy (examples being alkyl and aryl phosphites, alkyl and aryl phosphates, alkyl- and arylphosphanes, alkyl and aryl low-molecular-weight carboxylic esters, halogen compounds, salts, chalk, powdered quartz, glass fibres and carbon fibres, pigments and combinations of these. Compounds of this type are described by way of example in WO 99/55772, pp. 15-25, and in "Plastics Additives", R. Gächter and H. Müller, Hanser Publishers 1983).

Examples of suitable additives are described in "Additives for Plastics Handbook, John Murphy, Elsevier, Oxford 1999", and in "Plastics Additives Handbook, Hans Zweifel, Hanser, Munich 2001".

Examples of suitable antioxidants or heat stabilizers are: alkylated monophenols, alkylthiomethylphenols, hydroquinones and alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, acylaminophenols, esters of β-(3,5-di-tert-butyl-4-hydroxyphenyl)propionic acid, esters of β-(5-tert-butyl-4-hydroxy-3-methylphenyl)propionic acid, esters of β-(3,5-dicyclohexyl-4-hydroxy-phenyl)propionic acid, esters of 3,5-di-tert-butyl-4-hydroxyphenylacetic acid, amides of β-(3,5-di-tert-butyl-4-hydroxyphenyl)propionic acid, suitable thiosynergists, secondary antioxidants, phosphites and phosphonites, benzofuranones and indolinones.

Preference is given to organic phosphites, phosphonates and phosphanes, mostly those in which the organic moieties are composed entirely or to some extent of unsubstituted or substituted aromatic moieties.

Suitable complexing agents for heavy metals and for the neutralization of traces of alkali are o/m phosphoric acids, completely or partially esterified phosphates or phosphites.

Suitable light stabilizers (UV absorbers) are 2-(2'-hydroxyphenyl)benzotriazoles, 2-hydroxy-benzophenones, esters of substituted and unsubstituted benzoic acids, acrylates, sterically hindered amines, oxamides, and also 2-(hydroxyphenyl)-1,3,5-triazines, or substituted hydroxyalkoxyphenyl-1,3,5-triazoles, preference being given to substituted benzotriazoles, such as 2-(2'-hydroxy-5'-methylphenyl) benzotriazole, 2-(2'-hydroxy-3',5'-di-tert-butylphenyl) benzotriazole, 2-(2'-hydroxy-3'-tert-butyl-5'-methylphenyl)-5-chlorobenzotriazole, 2-(2'-hydroxy-3',5'-tert-butylphenyl)-5-chloro-benzotriazole, 2-(2'-hydroxy-5'-tert-octylphenyl)benzotriazole, 2-(2'-hydroxy-3',5'-di-tert-amylphenyl)benzotriazole, 2-[2'-hydroxy-3'-(3",4",5",6"-tetrahydrophthalimidoethyl)-5'-methyl-phenyl] benzotriazole and 2,2'-methylenebis[4-(1,1,3,3-tetramethylbutyl)-6-(2H-benzotriazol-2-yl)phenol].

Polypropylene glycols, alone or in combination with sulphones or with sulphonamides, for example, can be used as stabilizers to prevent damage by gamma rays.

These and other stabilizers can be used individually or in combinations, and can be added in the forms mentioned to the polymer.

Processing aids can also be added, examples being mould-release agents, mostly derivatives of long-chain fatty acids. Examples of those preferred are pentaerythritol tetrastearate and glycerol monostearate. They are used alone or in a mixture, preferably in an amount of from 0.01 to 1% by weight, based on the weight of the composition.

Suitable flame-retardant additives are phosphate esters, i.e. triphenyl phosphate, and resorcinol diphosphate, and bromine-containing compounds, such as brominated phosphoric esters, brominated oligocarbonates and polycarbonates, and also preferably salts of fluorinated organic sulphonic acids.

Suitable impact modifiers are butadiene rubber with a graft of styrene-acrylonitrile or methyl methacrylate, ethylene-propylene rubbers with a graft of maleic anhydride, ethyl and butyl acrylate rubbers with a graft of methyl methacrylate or styrene-acrylonitrile, and interpenetrating siloxane and acrylate networks with a graft of methyl methacrylate or styrene-acrylonitrile.

Colorants can also be added, examples being organic dyes or pigments, or inorganic pigments, or IR absorbers, individually or in a mixture, or else in combination with stabilizers, with glass fibres, with (hollow) glass beads, or with inorganic fillers.

The polycarbonates of the invention, if appropriate in a blend with other thermoplastics and/or with conventional additives, can be processed to give any desired mouldings/extrudates, and used wherever previously known polycarbonates and copolycarbonates are used.

The property profile of the polycarbonates of the invention makes them suitable as substrate materials for diffuser sheets or other sheets, sandwich panels, glazing, lamp covers or optical data storage devices, examples of which are audio-CD, CD-R(W), DVD, DVD-R(W) etc., but they can also be used by way of example as foils in the electrical sector, as mouldings in vehicle construction and as sheets for protective coverings in the safety and security sector. Other possible applications for the polycarbonates of the invention are:

- Safety panels which are known to be required in many regions of buildings, of vehicles and of aircraft, and also shields on helmets.
- Production of foils, in particular ski foils.
- Production of blown products (see by way of example U.S. Pat. No. 2,964,794), an example being water bottles holding from 1 to 5 gallons.
- Production of translucent sheets, in particular of hollow-chamber panels, for example for the protective covering of buildings, for example of railway stations or of greenhouses, and of lighting systems.
- Production of optical data storage devices.
- Production of traffic-signal housings or of traffic signs.
- Production of foams (see by way of example DE-B 1 031 507).
- Production of filaments and wires (see by way of example DE-B 1 137 167 and DE-A 1 785 137).
- Translucent plastics comprising glass fibres for lighting applications (see by way of example DE-A 1 554 020).
- Translucent plastics comprising barium sulphate, titanium dioxide and/or zirconium oxide or, respectively, organic polymeric acrylate rubbers (EP-A 634 445, EP-A 269 324), for the production of translucent and light-scattering mouldings.
- Production of small precision-engineered injection-moulded parts, for example lense holders. Polycarbonates comprising glass fibres are used for this purpose and, if appropriate, also comprise from about 1 to 10% by weight of $MoS_2$, based on total weight.
- Production of optical device components, in particular lenses for photographic cameras and for film cameras (see by way of example DE-A 2 701 173).
- Light transmitters, in particular optical conductor cables (see by way of example EP-A 0 089 801).
- Electrically insulating materials for electrical conductors and for plug housings, and also plug connectors.
- Production of mobile telephone casings with improved resistance to perfume, aftershave and sweat.
- Network interface devices.
- Carrier material for organic photoconductors.
- Production of lights, e.g. headlamps, diffuser sheets or inner lenses.
- Medical applications, e.g. oxygenators, dialyzers.
- Food-and-drink applications, e.g. bottles, tableware and chocolate moulds.
- Automobile-sector applications where contact with fuels and lubricants can occur, examples being bumpers, if appropriate in the form of suitable blends with ABS or suitable rubbers.
- Sports products, e.g. slalom poles or ski-boot clips.
- Household products, e.g. kitchen sink units and mail-box housings.
- Housings such as electrical distribution cabinets.
- Casings for electrical toothbrushes and hair-dryer casings.
- Transparent washing machines—portholes with improved resistance to the washing solution.
- Protective eyewear, optically corrective spectacles.
- Lamp covers for kitchen equipment with improved resistance to kitchen fumes, particularly oil fumes.
- Packaging foils for pharmaceutical products.
- Chip boxes and chip carriers.
- Other applications, e.g. animal cages, or feed doors for animal stalls.

The invention likewise provides the mouldings and extrudates obtainable from the polymers of the invention.

EXAMPLES

In order to study metallizing properties, rectangular injection-moulded plaques of dimensions 155×75×2.3 mm were prepared. Melt temperature was 300° C. and mould temperature was 100° C. The respective pellets were dried for 5 hours at 120° C. in a vacuum oven prior to processing.

Metallizing Process:

Before the test specimens were introduced into the vacuum chamber they were freed from dust by blowing with ionized air. The vacuum chamber with the test specimens was then evacuated to a pressure $p \leq 1 \cdot 10^{-5}$ mbar. Ar gas was then introduced up to a pressure of $5 \cdot 10^{-3}$ mbar. DC magnetron sputtering was used to apply an aluminium layer of thickness 200 nm to the specimens, using a power density of 2.9 W/cm². The specimens were located on a specimen dish which rotated at 20 rpm during the coating process. The sputter time was 12.5 min.

Metal Adhesion Test:

After the metallization process, the test specimens were removed from the vacuum chamber and adhesive tape (producer: 3M 853, width 19 mm) was applied within a period of 1 hour. After 24 hours, the adhesive tape was peeled at an angle of 180° at a rate of V=100 mm/min with the aid of a tensile machine (Instron 5566).

The aim here was to peel the aluminium layer from the substrate without leaving any residue, in order to draw quantitative conclusions about the adhesion of the aluminium to the substrate. The force needed to peel the adhesive tape was therefore determined. The peel force was divided by the width of the adhesive tape to obtain a peel force independent of the width of the adhesive tape.

Example 1

Production of a Chain Terminator of the Invention

N-(4-Hydroxyphenyl)phthalimide 360 g (2.43 mol) of phthalic anhydride are used as initial charge in 1.2 l of DMF (dimethylformamide) in a round-bottomed flask. 264 g (2.42 mol) of aminophenol are added slowly to this mixture. The mixture is stirred at 140° C. for 8 hours. During this period, water is removed by distillation by way of the head of a column. The mixture is permitted to cool to room temperature, and the precipitated solid is removed by suction filtration. The solid is washed first with water and then with ethanol, and is then dried in vacuo. This gives 445 g of a beige-coloured solid.

$^1$H NMR (400 MHz; DMSO): δ=7.98-7.85 (m, 4 H); 7.20 (d, 2 H), 6.89 (d, 2 H).

Example 2

Production of the Polycarbonate of the Invention 40 l of methylene chloride are added to a solution of 1096 g (4.8 mol) of bisphenol A, 2235 g (7.2 mol) of 1,1-bis(4-hydroxyphenyl)-3,3,5-trimethylcyclohexane and 2112 g (52.8 mol) of sodium hydroxide in 40 l of water, after inertization with nitrogen. 2374 g (24 mol) of phosgene are introduced at a pH of from 12.5 to 13.5 and at 20° C. In order to prevent the pH from falling below 12.5, 30% strength sodium hydroxide solution was added during the phosgenation process. After the phosgenation process had ended and the system had been flushed with nitrogen, 172 g (0.6 mol) of chain terminator from Example 1 are added, dissolved in a mixture composed of 2 l of methylene chloride and 0.3 l of THF (tetrahydrofuran), and the system is stirred for 15 minutes. Stirring is continued for a further 15 minutes, and 13.6 g (0.12 mol) of N-ethylpiperidine are added, and then stirring is continued for 1 hour. After removal of the aqueous phase, the organic phase is acidified with phosphoric acid and washed with distilled water until neutral and salt-free. The solvent is replaced by chlorobenzene and then the product is extruded at 295° C. and 80 rpm at 0.1 mbar through a vented extruder and pelletized through a pelletizer. This gives 2870 g of transparent pellets. The molar mass of the polycarbonate resin is Mn=6900 g/mol (number-average molar mass determined at room temperature by way of gel permeation chromatography calibrated to BPA polycarbonate using refractive index detector).

Metal adhesion test: The peel force was 4.8 mN/mm

Example 3

Production of a Chain Terminator of the Invention

N-(3-Hydroxyphenyl)phthalimide 452 g (3.0 mol) of phthalic anhydride are used as initial charge in 1.6 l of DMF (dimethylformamide) in a round-bottomed flask. 334 g (3.0 mol) of 3-aminophenol are added slowly to this mixture. The mixture is stirred at 140° C. for 8 hours. During this period, water is removed by distillation by way of the head of a column. The mixture is permitted to cool to room temperature, and the precipitated solid is removed by suction filtration. The solid is washed first with water and then with ethanol, and is then dried in vacuo. This gives 650 g of a beige-coloured solid.

$^1$H NMR (400 MHz; DMSO): δ=7.85-7.95 (m, 4 H); 7.28 (m, 1 H); 6.85 (m, 3 H).

Example 4

Production of a Polycarbonate of the Invention 40 l of methylene chloride are added to a solution of 1278.4 g (5.6 mol) of bisphenol A, 2607.7 g (8.4 mol) of 1,1-bis(4-hydroxyphenyl)-3,3,5-trimethylcyclohexane and 2464 g (61.6 mol) of sodium hydroxide in 40 l of water, after inertization with nitrogen. 2769 g (28 mol) of phosgene are introduced at a pH of from 12.5 to 13.5 and at 20° C. In order to prevent the pH from falling below 12.5, 30% strength sodium hydroxide solution was added during the phosgenation process. After the phosgenation process had ended and the system had been flushed with nitrogen, 201 g (0.8 mol) of chain terminator from Example 3 are added, dissolved in a mixture composed of 1.5 l of methylene chloride and 0.8 l of THF (tetrahydrofuran), and the system is stirred for 15 minutes. Stirring is continued for a further 15 minutes, and 15.8 g (0.14 mol) of N-ethylpiperidine are added, and then stirring is continued for 1 hour. After removal of the aqueous phase, the organic phase is acidified with phosphoric acid and washed with distilled water until neutral and salt-free. The solvent is replaced by chlorobenzene and then the product is extruded at 295° C. and 80 rpm at 0.1 mbar through a vented extruder and pelletized through a pelletizer. This gives 3.30 kg of transparent pellets. The molar mass of the polycarbonate resin is Mn=7300 g/mol (number-average molar mass determined at room temperature by way of gel permeation chromatography calibrated to BPA polycarbonate using refractive index detector).

Metal adhesion test: The peel force was 6.8 mN/mm.

Example 5

Comparative Example; Polycarbonate without Imide Units 40 l of methylene chloride are added to a solution of 1155 g (5.1 mol) of bisphenol A, 2345 g (7.6 mol) of 1,1-bis(4-hydroxyphenyl)-3,3,5-trimethylcyclohexane and 2220 g (55.5 mol) of sodium hydroxide in 40 l of water, after inertization with nitrogen. 2495 g (25.2 mol) of phosgene are introduced at a pH of from 12.5 to 13.5 and at 20° C. In order to prevent the pH from falling below 12.5, 30% strength sodium hydroxide solution was added during the phosgenation process. After the phosgenation process had ended and the system had been flushed with nitrogen, 60 g (0.6 mol) of phenol are added, dissolved in 1 l of methylene chloride, and the system is stirred for 15 minutes. Stirring is continued for a further 15 minutes, and 14.4 g (0.1 mol) of N-ethylpiperidine are added, and then stirring is continued for 1 hour. After removal of the aqueous phase, the organic phase is acidified with phosphoric acid and washed with distilled water until neutral and salt-free. The solvent is replaced by chlorobenzene and then the product is extruded at 330° C. and 80 rpm at 0.1 mbar through a vented extruder and pelletized through a pelletizer. This gives 2870 g of transparent pellets. The molar mass of the polycarbonate resin is Mn=7600 g/mol (number-average molar mass determined at room temperature by way of gel permeation chromatography calibrated to BPA polycarbonate using refractive index detector).

Metal adhesion test: The peel force was 3.7 mN/mm.

The level of metal adhesion properties of the polycarbonates of the invention (Example 2 and Example 4) is markedly higher (by about 30% and, respectively, 80%) in comparison with the conventional polycarbonate (Comparative Example 5), since a greater peel force is required to remove the coating.

Example 6

Production of an Imide-Functionalized Monomer of the Invention 5,5'-[(1-Methylethylidene)bis(4,1-phenylenoxy)]bis[2-(4-hydroxyphenyl)-1H-isoindole-1,3(2H)-dione]

247.2 g of 4,4'-(4,4'-isopropylidenediphenoxy)bis(phthalic anhydride) (0.47 mol) are dissolved in 200 ml of DMF in a 3 l three-necked flask with reflux divider, reflux condenser and distillation bridge. 105.8 g of 4-aminophenol (0.095 mol) are slowly added dropwise. The mixture is heated at reflux for 2 hours. Water is continuously removed by distillation during this process. The mixture is then cooled, diluted with 500 ml of dichloromethane, and washed twice with water. Finally, the product is washed with saturated NaCl solution. The organic phase is concentrated, and the residue is brought to the boil in 300 ml of methanol. After cooling, the residue is isolated by suction filtration and then washed with 200 ml of methanol.

$^1$H NMR (400 MHz; DMSO): δ=9.75 (s, 2H); 8.05 (m, 2 H); 7.30-7.45 (m, 8H); 7.10-7.20 (m, 8H); 6.85 (m, 4H).

Example 7

Production of a Polycarbonate of the Invention 40 l of methylene chloride are added to a solution of 1097 g (4.8 mol) of bisphenol A, 1541 g (5.0 mol) of 1,1-bis(4-hydroxyphenyl)-3,3,5-trimethylcyclohexane and 477 g (0.68 mol) of the imide-functionalized bisphenol from Example 6, and also 1839 g (46.0 mol) of sodium hydroxide in 40 l of water, after inertization with nitrogen. 2067 g (20.9 mol) of phosgene are introduced at a pH of from 12.5 to 13.5 and at 20° C. In order to prevent the pH from falling below 12.5, 30% strength sodium hydroxide solution was added during the phosgenation process. After the phosgenation process had ended and the system had been flushed with nitrogen, 59 g (0.6 mol) of phenol are added, dissolved in 1 l of dichloromethane, and the system is stirred for 15 minutes. Stirring is continued for a further 15 minutes, and 11.8 g (0.10 mol) of N-ethylpiperidine are added, and then stirring is continued for 1 hour. After removal of the aqueous phase, the organic phase is acidified with phosphoric acid and washed with distilled water until neutral and salt-free. The solvent is replaced by chlorobenzene and then the product is extruded at 305° C. and 136 rpm at 0.02 mbar through a vented extruder and pelletized through a pelletizer. This gives slightly yellowish-coloured transparent pellets. The molar mass of the polycarbonate resin is Mn=12 800 g/mol (number-average molar mass determined at room temperature by way of gel permeation chromatography calibrated to BPA polycarbonate using refractive index detector).

Metal adhesion test: The peel force was 7.2 mN/mm.

Example 8

Comparative Example, Synthesis of an Imide-Containing Bisphenol

N,N-Bis(p-hydroxyphenyl)-1,2,4,5-benzenetetracarboxylic 1,2,4,5-diimide 112 g (0.5 mol) of benzene-1,2,4,5-tetracarboxylic dianhydride are used as initial charge in 1.2 l of DMF in a 2 l four-necked flask with reflux condenser and reflux column, under argon. 122 g (1.1 mol) of 4-aminophenol are added. The mixture is heated at reflux for 6 hours.

Once the exothermic reaction has ended, the temperature is carefully increased to 80° C. Water is continuously withdrawn from the reaction mixture during this process.

The crude product is isolated by filtration and then washed twice, in each case with 500 ml of methanol. The product is dried in vacuo. This gives 179 g of a yellow solid.

$^1$H NMR (400 MHz; DMSO): δ=8.30 (s, 2 H) 7.27 (d, 4 H); 6.91 (d, 4 H).

Example 9

Comparative Example, Production of a Polycarbonate Having Imide Units 40 l of methylene chloride are added to a solution of 911 g (3.99 mol) of bisphenol A, 1695 g (5.46 mol) of 1,1-bis(4-hydroxyphenyl)-3,3,5-trimethylcyclohexane and 421 g (1.05 mol) of the imide-functionalized bisphenol from Example 8, and also 1884 g (46.20 mol) of sodium hydroxide in 40 l of water, after inertization with nitrogen. 2077 g (21.0 mol) of phosgene are introduced at a pH of from 12.5 to 13.5 and at 20° C. In order to prevent the pH from falling below 12.5, 30% strength sodium hydroxide solution was added during the phosgenation process. After the phosgenation process had ended and the system had been flushed with nitrogen, 31.6 g (0.33 mol) of phenol are added, dissolved in 1 l of dichloromethane, and the system is stiffed for 15 minutes. Stirring is continued for a further 15 minutes, and 11.9 g (0.11 mol) of N-ethylpiperidine are added, and then stirring is continued for 1 hour. After removal of the aqueous phase, the organic phase is acidified with phosphoric acid and washed with distilled water until neutral and salt-free. The solvent is replaced by chlorobenzene and then the product is extruded at 330° C. and 80 rpm at 0.1 mbar through a vented extruder and pelletized through a pelletizer. This gives 3305 g of transparent pellets. The molar mass of the polycarbonate resin is Mn=13 500 g/mol (number-average molar mass determined at room temperature by way of gel permeation chromatography calibrated to BPA polycarbonate using refractive index detector).

Metal adhesion test: The peel force was 4.2 mN/mm.

Surprisingly, use of the imide-containing monomer from Example 8, not of the invention, leads only to a small rise in adhesion to metal, based on the amount of imide used. Although the amount of imide-modified monomer used is higher in comparison with Example 2, the rise in adhesion force is only small.

The invention claimed is:
1. A polycarbonate comprising,
A. as a diphenol unit, a compound of the formula (I)

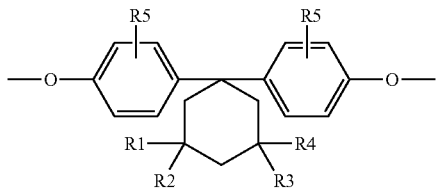
(I)

wherein R1 to R5, independently of one another, represents H or a C1-C5-alkyl,
B. at least one compound selected from the group consisting of compounds of the formula (II) and (III), and at least one compound selected from the group consisting of compounds of the formula (IV) and (V)

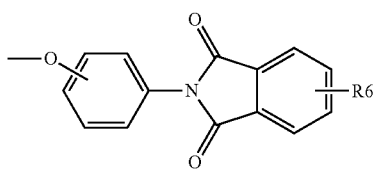
(II)

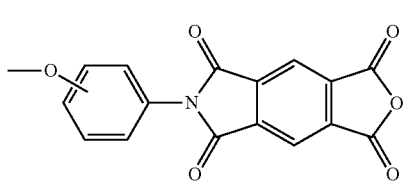
(III)

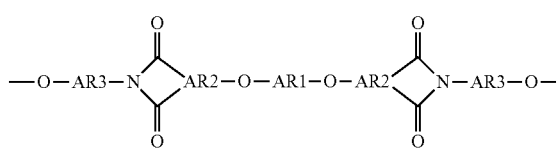
(IV)

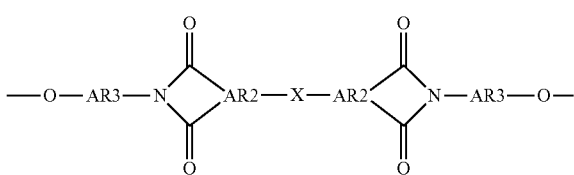
(V)

wherein
R6 represents H or a C1-C12-alkyl,
AR1 represents an optionally substituted aryl moiety,
AR2 represents an optionally substituted trivalent aryl moiety and
AR3 represents a divalent aryl moiety which can be optionally substituted by a compound selected from the group consisting of a C1-C10-alkyl, a C1-C10-alkyl having one or more hydroxy substituents, a halogen, and mixtures thereof, and
X is O, S or a single bond.
2. The polycarbonate according to claim 1, wherein:
AR1 derives from a diphenol selected from the group consisting of hydroquinone, resorcinol, dihydroxybiphenyl, bis(hydroxyphenyl)alkanes, bis(hydroxyphenyl)cycloalkanes, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides, α, α'-bis(hydroxyphenyl)diisopropylbenzenes, and also their alkylated, ring-alkylated , ring-halogenated compounds, and mixtures thereof;
AR2 is a trivalent phenyl or naphthyl, which is optionally substituted by a C1-C10-alkyl, a halogen, or mixtures thereof; and
AR3 is a divalent phenyl, which is optionally substituted by a C1-C10-alkyl, a C1-C10-alkyl having one or more hydroxy substituents, a halogen, or a mixture thereof or is a C1-C8-alkyl.
3. The polycarbonate according to claim 1, wherein
AR1 derives from hydroquinone, bisphenol A or bisphenol TMC (1,1-bis(4-hydroxyphenyl)-3,3 5-trimethylcylcohexane);
AR2 is a trivalent phenyl which is optionally substituted by methyl, ethyl halogen, or mixtures thereof;
AR3 is a divalent phenyl which is optionally substituted by methyl, ethyl, hydroxymethyl, hydroxyethyl, halogen, or a mixture thereof, or is ethyl;
X is oxygen;
R6 is hydrogen; and
R1 to R5 independently of one another, are hydrogen or methyl.
4. The polycarbonate according to claim 1 having a molecular weight (number average) of from 500 to 500 000.
5. The polycarbonate according to claim 1 having a molecular weight (number average) of from 500 to 5000.
6. The polycarbonate according to claim 1 having a molecular weight (number average) of from 1000 to 5000.
7. The polycarbonate according to claim 1 comprising from 0.5 to 8 mol %, based on one mole of the particular diphenol(s) used, of at least one compound of the formula (II) and (III); and from 5 to 50 mol %, based on the total number of moles of diphenol used, of the compound of the formula (IV).
8. A composition comprising the polycarbonate according to claim 1.
9. A composition according to claim 8, further comprising polycarbonates having a diphenol composed of a compound of the formula (VIII)

HO—Z—OH    (VIII)

wherein
Z represents a moiety of the formula (VIIIa)

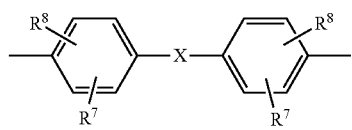
(VIIIa)

wherein
R7 and R8 independently of one another is a compound selected from the group consisting of H, a $C_1$-$C_{18}$-alkyl, a $C_1$-$C_{18}$-alkoxy, a halogen, an optionally substituted aryl, and an optionally substituted aralkyl,
X is a single bond or a compound selected from the group consisting of —$SO_2$—, —CO—, —O—, —S—, a $C_1$-$C_6$-alkylene, a $C_2$-$C_5$-alkylidene, a $C_5$-$C_6$-cycloalkylidene which is optionally substituted by a $C_1$-$C_6$-alkyl , and a $C_6$-$C_{12}$-arylene which can optionally have been condensed with further aromatic rings comprising heteroatoms.

10. The composition according to claim 9, wherein the diphenol of the formula (VIII) is selected from the group consisting of bisphenol TMC, bisphenol A, and mixtures thereof.

11. A molding obtained from the polycarbonate according to claim 1.

12. A molding obtained from the composition according to claim 8.

* * * * *